US012744797B2

(12) United States Patent
Goel et al.

(10) Patent No.: US 12,744,797 B2
(45) Date of Patent: Sep. 22, 2026

(54) EGRESS LINK SAFETY FOR LARGE UNCONTROLLABLE WORKLOADS IN A COMPUTING INFRASTRUCTURE

(71) Applicant: Akamai Technologies, Inc., Cambridge, MA (US)

(72) Inventors: Utkarsh Goel, Playa Del Rey, CA (US); Peter B. Chave, Andover, MA (US); Philip A. Lisiecki, Santa Barbara, CA (US); Igor B. Lubashev, Arlington, MA (US)

(73) Assignee: Akamai Technologies, Inc., Cambridge, MA (US)

( * ) Notice: Subject to any disclaimer, the term of this patent is extended or adjusted under 35 U.S.C. 154(b) by 0 days.

(21) Appl. No.: 18/971,229

(22) Filed: Dec. 6, 2024

(65) Prior Publication Data

US 2026/0163893 A1 Jun. 11, 2026

(51) Int. Cl.
*H04L 9/40* (2022.01)

(52) U.S. Cl.
CPC ................................ *H04L 63/1416* (2013.01)

(58) Field of Classification Search
CPC .................................................. H04L 63/1416
See application file for complete search history.

(56) References Cited

U.S. PATENT DOCUMENTS 9,485,197 B2 * 11/2016 Dutta .................. H04L 49/3045
10,394,611 B2 * 8/2019 Mallipeddi ........... G06F 9/5061
11,461,150 B1 * 10/2022 Harjono ................ G06F 9/3555
2013/0212279 A1 * 8/2013 Dutta .................... G06F 9/5077 709/226
2014/0258535 A1 * 9/2014 Zhang ................... G06F 9/5072 709/226
2023/0066784 A1 * 3/2023 Chitrigi Ganesh .......................... H04L 12/4641

(Continued)

FOREIGN PATENT DOCUMENTS

KR 10-1474872 B1 12/2014
KR 10-2020-0013129 A 4/2026

OTHER PUBLICATIONS

PCT/US2025/058610, International Search Report and Written Opinion, mailed Apr. 10, 2026, 10 pages.

(Continued)

*Primary Examiner* — Chau Le
(74) *Attorney, Agent, or Firm* — David H. Judson

(57) ABSTRACT

A cloud provider implements a safety mechanism for links associated with its infrastructure. Link safety is achieved by changing how server and network capacity information is shared by the cloud provider with a customer entity that utilizes the infrastructure. To this end, the entity is provided information about defining a "mini-cluster" that is configured from a physical server cluster, and where the mini-cluster services only one particular link. A mini-cluster has one or more servers, typically virtual machines. The egress capacity of each of the servers within a mini-cluster is capped to match a maximum link capacity that is allocated to the customer entity's traffic. By dedicating a fixed set of servers to the link and capping the total server capacity to a maximum link size defined for a given customer, traffic provided by the customer entity's software system is controlled to prevent link overload.

15 Claims, 5 Drawing Sheets

(56) References Cited

U.S. PATENT DOCUMENTS

2024/0187479 A1* 6/2024 Agarwal ............. H04L 41/0668
2024/0305688 A1* 9/2024 Raju A ............... H04L 67/1095

OTHER PUBLICATIONS

Kangralkar, et al., "Kubernetes Services External IP Showing as Pending in Minikube," Jul. 17, 2024, https://www.baeldung.com/ops/minikube-k8s-service-external-ip-pending#; ~:text=3.%20Assigning%20the%20External%20%20Using%20Minikube.

Kataria, et al., "Saving Private WAN: Using Internet Paths to Offloard WAN Traffic in Conferencing Services," ArXIV:2407.02037V1 [CS. NI], Jul. 2, 2024 X abstract; pp. 1-17; and table 2.

Kim, et al., "Holistic VM Placement for Distributed Parallel Applications in Heterogeneous Clusters," IEEE Transactions on Services Computing, vol. 14, Issue 5. Oct. 8, 2021 A pp. 1411-1424.

* cited by examiner

```
{
  "capacity_info": [
        {
            "links": ["1"],
            "cluster_id": "us-atlanta-dc1-cluster1-link1",
            "server_ip": ["1.1.1.1"],
            "parent_server": ["5.5.5.5", "6.6.6.6"],
            "link_capacity_mbps": 250
        },
        {
            "links": ["2"],
            "cluster_id": "us-atlanta-dc1-cluster1-link2",
            "server_ip": ["2.2.2.2", "3.3.3.3", "4.4.4.4"],
            "parent_server": ["5.5.5.5", "6.6.6.6"],
            "link_capacity_mbps": 750
        }
    ]
}
```

FIG. 5

EGRESS LINK SAFETY FOR LARGE UNCONTROLLABLE WORKLOADS IN A COMPUTING INFRASTRUCTURE

BACKGROUND

Traditionally, and commonly, a customer of a cloud provider is responsible for identifying a strategy suitable for deploying their applications at locations within the cloud provider's infrastructure that are best suited to meet their performance, operational, and business goals. Such customer-driven deployments, however, are not consulted with the cloud provider and therefore bring challenges to the cloud provider in terms of managing the network bandwidth. Specifically, customers are not aware of the network connectivity within the cloud provider's infrastructure, and therefore, customers lack visibility into available headroom on various links, changing traffic patterns from other customers using the same links, and other such factors. Rather, such information is only available and accessible to the cloud provider. Typically, customers assume that the servers on which they deployed their applications have unrestricted network bandwidth and can connect to all Internet service providers, via direct routes or over transit. Depending upon the cloud provider's arrangements with the ISP provider, however, the deployed bandwidth may be limited. Consequently, when customers load-balance their end-user traffic on cloud provider's links without knowing real-time link constraints, they may overload those links.

More recently, another class of customers has emerged that leverage a cloud provider infrastructure in untraditional ways. These customers require that a cloud provider identify a server and network provisioning strategy best suited to meet customer requirements, which may include the total network bandwidth to be deployed within the country of operation, across various key metro locations, or for specific ISP/ASN providers. The cloud provider then performs infrastructure analysis to prepare a deployment plan, including the deployment of new servers and network bandwidth needed for the customer. Once the server and network are deployed, each server can access one or more ISP links available in the data center where the servers are deployed. The server deployment and network connectivity information is then shared with the customer, who then ingests it into their load balancer to map their end-user traffic to suitable servers. Like the traditional approach to managing cloud computing resources, the customers are responsible for end-user mapping without the knowledge of real-time network traffic patterns and available link headroom on the cloud provider infrastructure. For such customers, the cloud provider must ensure that their server and network deployment strategy does not cause network congestion and service degradation within their infrastructure.

When link overloading happens due to load-balancing decisions made by the customer, it is technically possible to employ the traditional approach of server throttling to mitigate link overload issues; however, throttling server traffic is not a suitable option for such customers because throttling impacts the end-user quality of experience. And, if throttling is applied to the entire server capacity, then all traffic (including the one on non-overloaded links) served by it will be throttled. A lower quality of experience from a cloud provider could cause the customer to reduce the provider's traffic share, thus causing a drop in revenue for the cloud provider.

One possible solution to this problem is to have the cloud provider share a constant feed of its network connectivity with each server and available headroom with the customer so that the customer can automatically detect link overloads and relocate its traffic to the next best links. Such an approach, however, requires a cloud provider's trust and reliance on the customer for the safety of the cloud provider's network. Any external dependency to maintain infrastructure reliability is not suitable for the business needs of the cloud provider because software bugs and other issues on the customer systems can severely impact the cloud provider's network. Therefore, solutions that can be employed by cloud providers without the engagement of customers are best suited here.

More generally, for these customers, the end-user traffic must seamlessly move away from overloaded links to the next best available link. Even though the cloud provider may know the next best link for the customer traffic, the cloud provider does not have awareness of which server contains the content being served to the end user. As such, the cloud provider is unable to relocate to a different server. Therefore for such customers, the traffic must be relocated via the customer's load balancer.

One solution available to cloud providers to accomplish that is to suspend one or more customer-specific servers serving traffic over the overloaded link. Server suspensions will reduce traffic on overloaded links and the impacted traffic will go through the customer's load-balancer system to find the next best suitable server. However, because a customer-specific server could be serving traffic over many network links associated with many ISP providers at the same time, suspending one or more servers would also reduce the traffic on non-overloaded links as well, causing a higher-than-necessary reduction of traffic served by the cloud provider, causing a loss in revenue for the cloud provider for the traffic served over the cloud infrastructure. Such action would also trigger unnecessary traffic relocation that was correctly being served over non-overloaded links. Moreover, because several servers in a datacenter or a cluster could be serving traffic on the overloaded link, suspending a single server may only reduce a small portion of the traffic, not enough to mitigate the overload link. As a result, the cloud provider may require several servers to be suspended, however, such an action could cause a major drop in the total traffic served by the cloud provider, resulting in an additional loss in revenue for the cloud provider.

Server suspensions are also a common practice in Content Delivery Networks (CDNs). To mitigate link overloads, resource management system may suspend the overloaded link, one or more clusters, and ultimately entire datacenters. FIG. 1 depicts this known process. In this example scenario, assume several ISP links 100 of varying sizes (depending on the contract negotiations between the cloud provider and ISP provider) are available to a server cluster 102. In the traditional cloud computing approach, a customer-driven load balancer 104 (configured with server and network information 105) can incorrectly place traffic on the network links and overload any available links smaller than the total cluster size. The overload could happen by utilizing most or all of the cluster's capacity to serve traffic on the small links, causing congestion and service degradation for all traffic served via the cloud provider's infrastructure. A server suspension taken by the cloud provider would result in the removal of traffic on non-overloaded links, which would remove more traffic than necessary. As depicted, suppose a cloud provider has provisioned the server cluster 102 of nineteen (19) machines, each machine 106 capable of egressing a maximum of 30 Gbps, totaling a maximum of 570 Gbps of egress bandwidth across all the network links available to the cluster. This cluster can overload any of the four links shown. To mitigate the overload, a cloud provider would have to suspend one or more machines, causing more than necessary drops in overall traffic.

Summarizing, techniques related to server throttling impact end-user quality of experience and cloud provider's traffic share and are, therefore not suitable for both customers and cloud providers. Similarly, techniques related to server suspensions impact all traffic served by the suspended server and are also therefore not suitable for customers and cloud providers. Finally, techniques that require a cloud provider to rely on customer-driven load-balancers to maintain safety within the cloud provider's network are not suitable for the cloud provider. As a result, cloud providers remain restricted in their ability to protect their network infrastructure while satisfying customer requirements for high performance at the same time.

The subject matter of this disclosure provides a solution to these problems.

SUMMARY

According to this disclosure, a cloud provider implements a safety mechanism for a set of links associated with its infrastructure. Link safety is achieved by changing how server and network capacity information is shared by the cloud provider with a customer entity that utilizes the infrastructure to run a workload (e.g., an application). To this end, and instead of providing control information (signaling) that indicates to the entity that some physical server cluster is available to service all associated links, the entity (and more specifically, the entity's traffic management system, such as a load balancer) is provided information about one or more virtual "mini-clusters" that are constructed from that physical server cluster, and where each mini-cluster preferably serves only one link of the set of links. The egress capacity of each of the servers within a mini-cluster is capped to match a maximum link capacity that is allocated to the customer entity's traffic. With this change egress link by dedicating a fixed set of one or more servers (a "mini-cluster") to the link and capping the total server capacity to a maximum link size defined for a given customer, where that customer has associated therewith a load balancer (or other traffic manager) that has the capability of otherwise overloading the link. The solution also ensures that traffic on non-overloaded links associated with the is never reduced.

BRIEF DESCRIPTION OF DRAWINGS

FIG. 5 depicts a representative format for a set of information generated by the link-to-mini-cluster mapping algorithm of this disclosure and that is shared by the cloud provider to a customer entity.

DETAILED DESCRIPTION

The following glossary of terms is used herein:

Cloud Provider—This term refers to traditional cloud providers, and well as overlay network providers (such as Content Delivery Networks or "CDNs") that extend their network infrastructure for offering shared or dedicated cloud computing services.

Customer—This term refers to the customer of the cloud provider requiring compute capacity and network bandwidth within the cloud provider's infrastructure.

Link—This term refers to a physical or virtual network connection serving a group of destination CIDR blocks, ASNs, or other network information. Traffic on links could be served directly to eyeball networks using Private Network Interconnects (PNIs) to ISP providers, cloud provider's backbone infrastructure using Inter ECOR Networks (IEN), or Inter City Networks (ICN links), and transit links. As used herein, an ECOR is a shorthand for "Equivalence-Class-Of-Region," typically a collection of one or more virtual or physical server clusters offering same or different services and residing within a cloud provider-owned datacenter or a third-party datacenter facility, offering connectivity to one or more networks. Links could be available locally within the same datacenter where servers are deployed, or be available through the cloud provider's backbone or other networking infrastructure.

Server—This term refers to a compute resource which may be an entire physical machine, a portion of a physical machine, a virtual machine, a container, or a pod deployed by the cloud provider to serve a customer entity's traffic.

Throttling—This term refers to an action that limits the amount of packets or bytes a server can transmit on a network.

Uncontrollable Traffic—this class of traffic refers to any traffic placed on the cloud provider's network infrastructure by a software system not controlled by the cloud provider.

Figure 2:
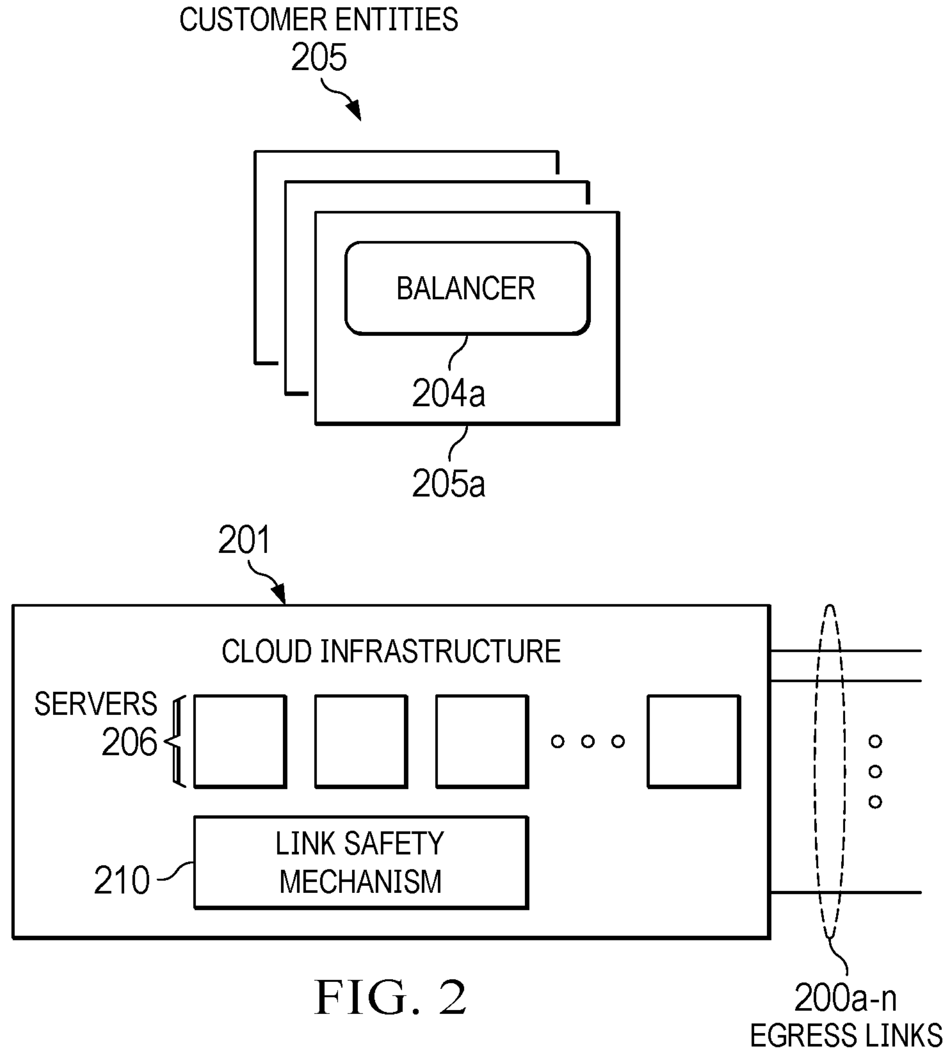
FIG. 2 depicts a representative cloud provider network infrastructure in which the link safety techniques of this disclosure are implemented.

As depicted in FIG. 2, and in a representative embodiment, a cloud provider (either a native provider, an overlay network provider, or the like) operates cloud infrastructure 201, typically in association with one or more datacenters. One or more egress links 200*a-n* are associated with the infrastructure 201. To provide one or more services, the cloud provider operates a set of servers, such as server 206. One or more customers (more generally, and typically, organization or enterprise "entities") 205 that require compute capacity and network bandwidth obtain services from the cloud provider. In an operating scenario, the customer (or some third party on its behalf) 205*a* manages its own software system 204*a* (e.g., a load balancer or other traffic manager) that is assumed to place uncontrollable traffic on the cloud provider's network infrastructure. As will be described, the techniques of this disclosure are operative to provide a safety mechanism 210 for the set of links, such as a link that, according to the techniques of this disclosure, is uniquely associated with a first customer 205*a*. This safety mechanism does not require any cooperation of that customer, even if the customer-controlled load-balancer tries to incorrectly overload the link. As will be seen, this unilateral link safety is achieved by dedicating a fixed set of servers to each link (such as link 200*a*) and capping the total server capacity to the maximum link size defined for the particular customer that is associated to the link.

In particular, and instead of using the traditional approach of provisioning a pool of servers to serve a certain amount of traffic across various network links of varying sizes at the same time, the solution herein is to provision servers for the customer in a way that limits a given server (or a pool of servers) to serve traffic, preferably on only one available network link. In this way, and in a representative implementation, every link available to every customer being serviced in the infrastructure has its own server (or pool of servers) associated to that link (and to that customer). The number of servers associated with each link then depends on the total number of links available in the data center and the size of each link.

Figure 1:
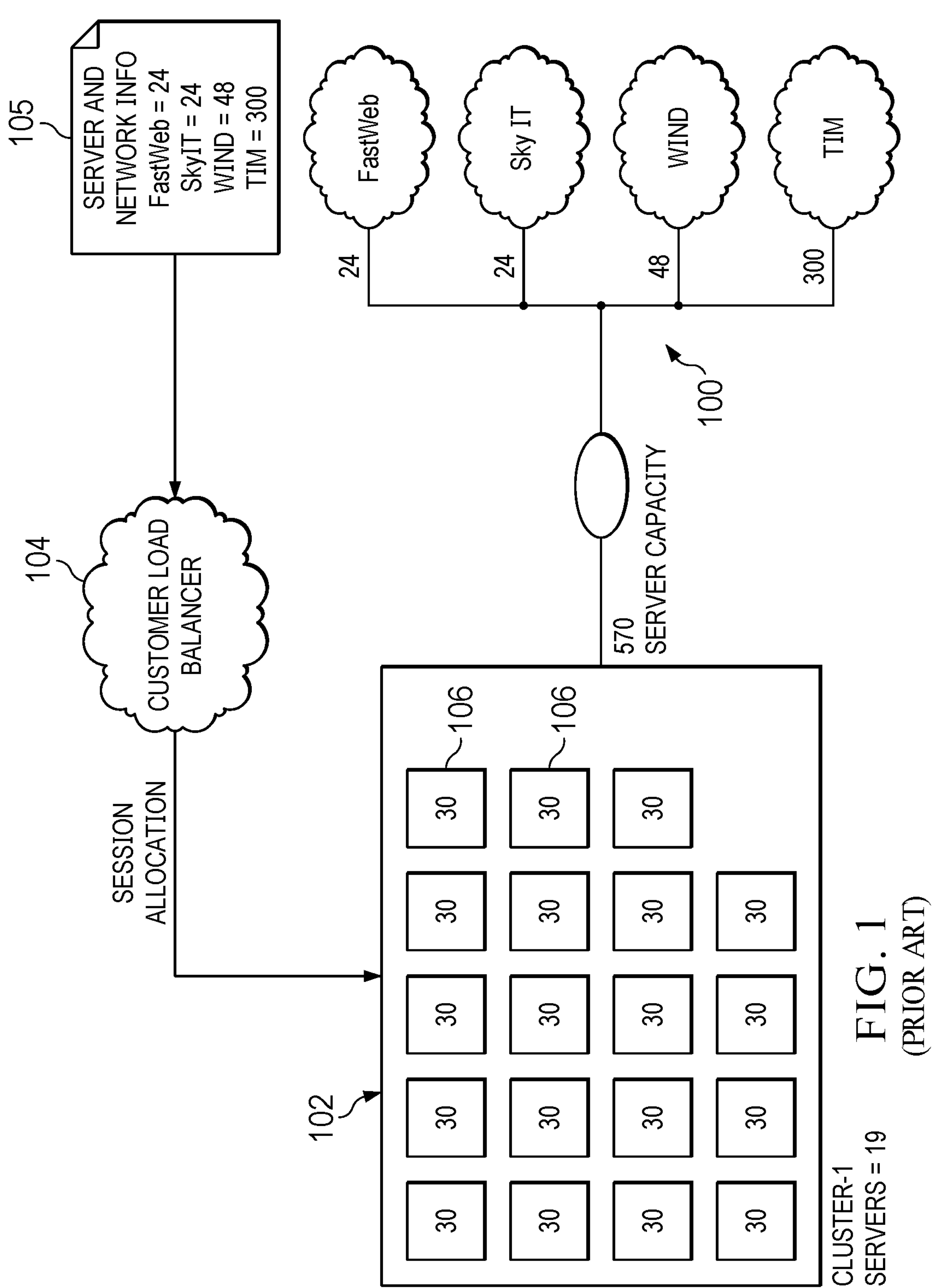
FIG. 1 depicts a cloud provider network infrastructure deployment that is known in the art.
Figure 3:
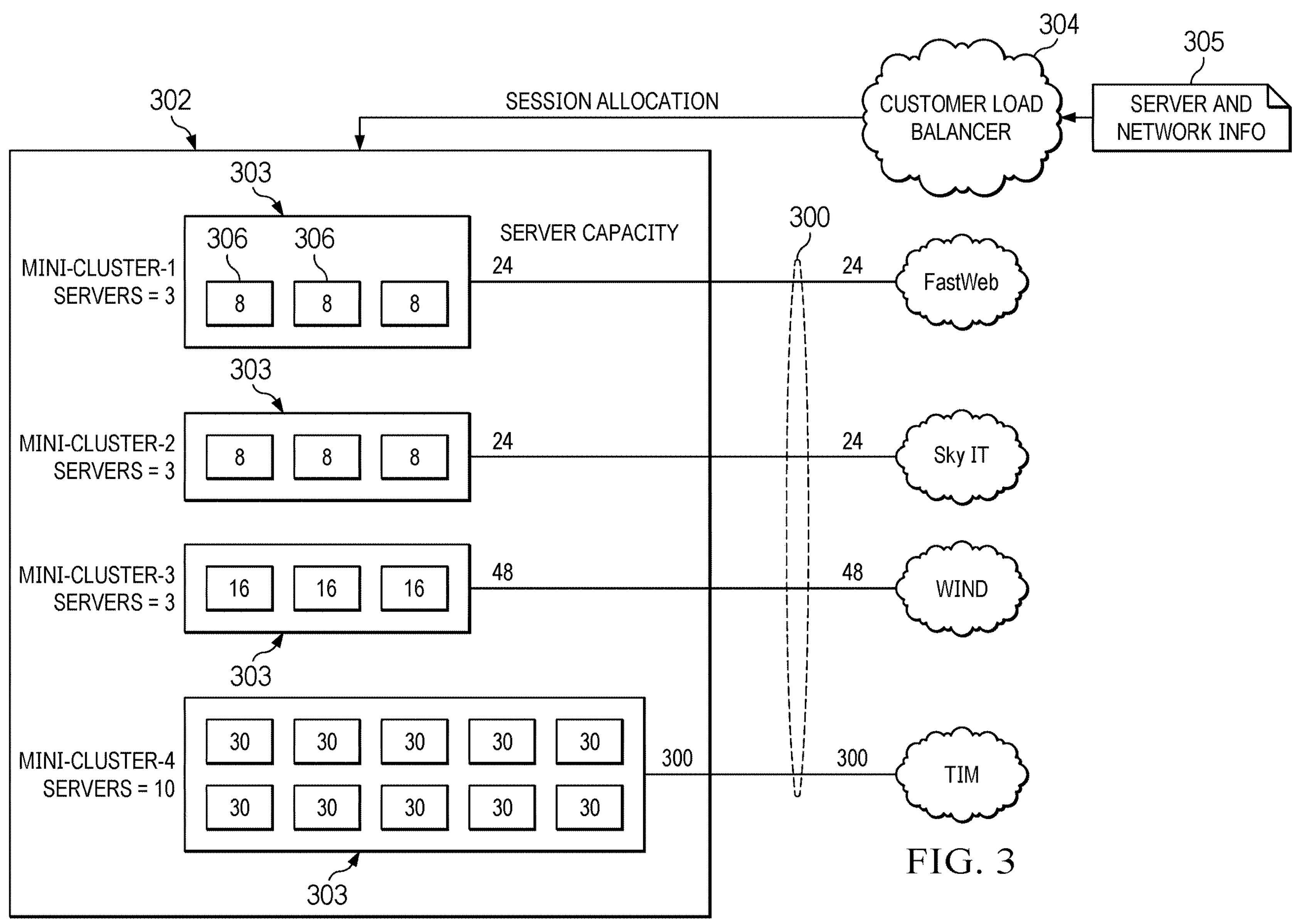
FIG. 3 depicts the cloud provider infrastructure in the example of FIG. 1 that is re-configured according to the provisioning techniques of this disclosure.

FIG. 3 depicts the above-described solution. Continuing with the example scenario described in FIG. 1, here the representative server cluster 302 of nineteen (19) machines (the number of machines here is not intended as a limitation) is split into several smaller clusters (mini-clusters), where each mini-cluster 303 is associated with only one of the links 300 available in the data center. The servers 306 within the mini-cluster 303 are then scaled to have as many machines as necessary to provide the bandwidth associated with its corresponding link. If a single server can serve more than the total link bandwidth required, that server's maximum capacity is set to be as much as the link limit. In addition, and as will be described, the customer load balancer 304 is provided with a special set of capacity information 305 that is sourced to the customer entity from the cloud provider.

Figure 4:
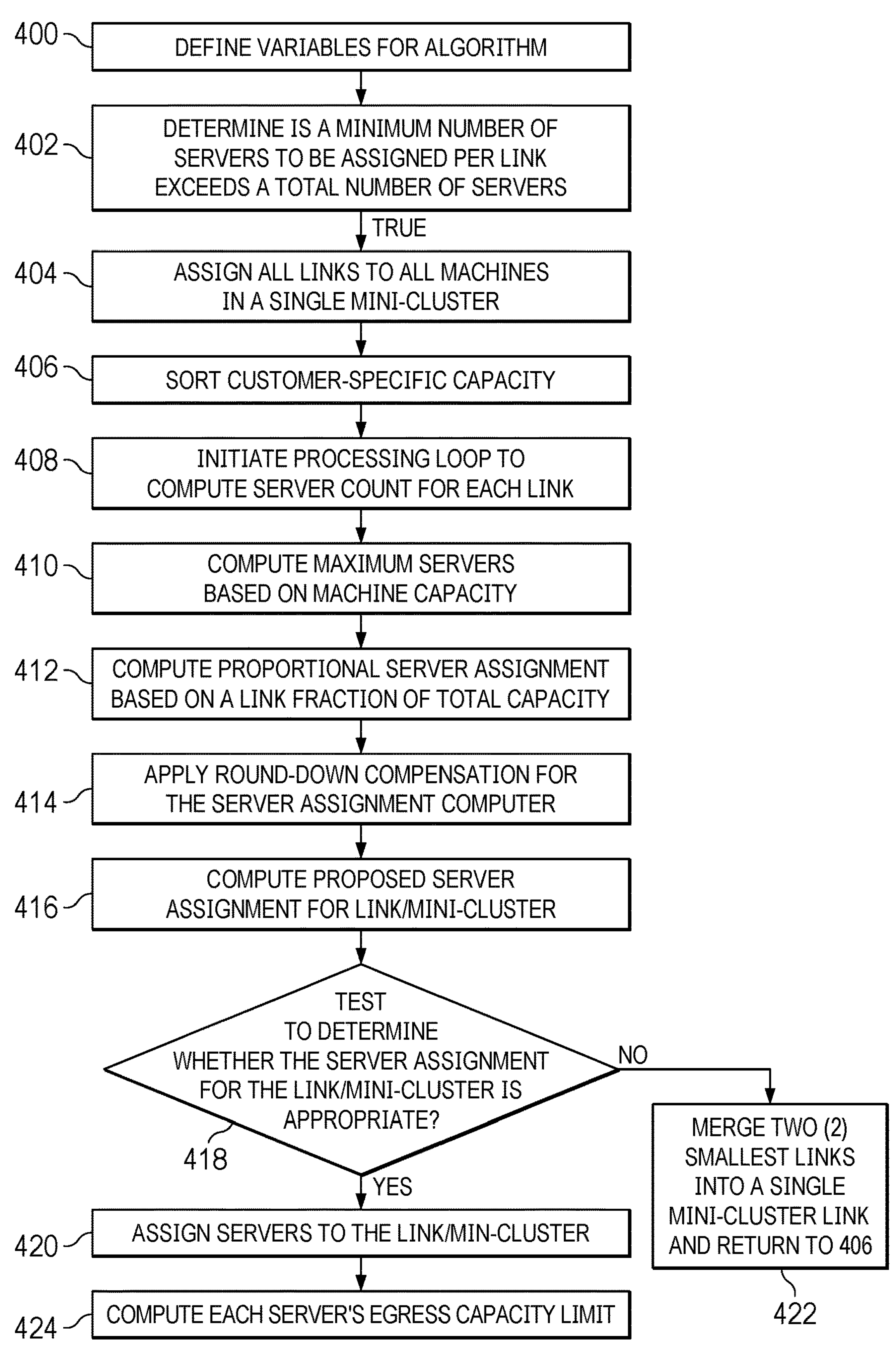
FIG. 4 depicts a process flow for a link-to-mini-cluster mapping algorithm in a representative embodiment.

The following provides additional details regarding a technique to generate link to mini-cluster mappings according to an embodiment. Initially, the cloud provider identifies a strategy specific to the customer requirements that provisions compute servers and available link bandwidth. In some cases, enough servers may not be available to accommodate all available links, as such, some servers may need to be allocated to two or more links. In other cases where enough servers are available, each link can be allocated its dedicated pool of servers. Based on the customer requirements, the provider may deploy a physical server for the customer or a set of VMs on the same physical server. More generally, the goals of the assignment include the following: (1) because larger links naturally get more traffic due to the larger number of end-users behind them, preferably the link-to-mini-cluster mapping algorithm assigns more servers to the larger links; (2) at least N servers should be assigned to each link to ensure server redundancy; (3) if a link cannot be assigned to at least N servers (e.g., due to server shortage), the algorithm may merge servers serving several smaller links, preferably without compromising the server allocation for the larger link; and (4) whenever possible, maximize server capacity utilization, even if some excess server capacity is unassigned to any link. A representative mapping technique that satisfies these goals is described below and with further reference to the process flow shown in FIG. 4.

At step 400, several variables are defined. In particular, let $S_{Total}$ be the total number of servers deployed for the customer within the datacenter. Let $E_{Max}$ be the maximum egress capacity of the server deployed for the customer. Let E; be the egress capacity of each server assigned for the $i^{th}$ link. Let C; be the customer-specific capacity of the $i^{th}$ link. Let $S_i$ be the count of servers assigned to the $i^{th}$ link. Let $S_{MIN}$ be the minimum number of servers to be assigned per link.

At step 402, determine if $S_{MIN} \geq S_{TOTAL}$

If the computation at step 402 returns true, at step 404 the algorithm assigns all links to all machines in a single mini-cluster. At step 406, the algorithm sorts $C_i$ in ascending order. At step 408, the following processing loop is then initiated to compute $S_i$ values for each link. To this end, at step 410, the algorithm computes maximum servers based on machine capacity:

$$M_i = \text{CEILING}\left(\frac{C_i}{E_{Max}}\right).$$

At step 412, the algorithm computes proportional server assignment based on a link fraction of total capacity:

$$P_i = \text{FLOOR}\left(S_{TOTAL} \cdot \frac{C_i}{\sum_{\square=1}^{\square} C_j}\right).$$

At step 414, the algorithm applies a round-down compensation for the proportional server assignment computed in step 412:

$$R_i = \text{ROUND}\left(\left(S_{TOTAL} - \sum_{j=1}^{i-1} S_j\right) \cdot \frac{C_i}{\sum_{j=i}^{N} C_j}\right)$$

At step 416, the algorithm computes a proposed server assignment for the link/mini-cluster i:

$$S_i = \max(S_{MIN}, \min[M_i, \max(P_i, R_i)]).$$

Steps 410, 412, 414 and 416 thus provide the processing constraints for computing the $S_i$ values for the link. This completes the processing loop. Note that, in operation, step 416 always assigns at least $S_{MIN}$, assigns at most $M_i$ (subject to the constraint computed in step 410), tries to assign $P_i$ (subject to the constraints computed n steps 410 and 412), but also allows an increase to $R_i$ (also subject to the first two constraints).

The algorithm then continues at step 418 to test whether $$\sum_{j=i}^{N} S_j \leq S_{Total}.$$

If the outcome of the test at step 418 is true, this implies that the total compute server capacity in the datacenter is large enough to accommodate the proposed assignment, at which point the algorithm proceeds to step 420. If, however, the outcome of the test at step 418 is false, then control continues at step 422 to merge the two smallest "links" $C_1$ and $C_2$ into a single "mini-cluster link" with capacity ($C_1$+$C_2$). Control then returns to step 406 and iterates. Note that for the second and any subsequent iterations of this step, either or both of the smallest "links" may be a mini-cluster from a prior iteration.

At step 420, the algorithm assigns $S_i$ servers to the $i^{th}$ link/mini-cluster. Control then continues at step 424 to compute each server's egress capacity limit according to its assigned link/mini-cluster as follows: $E_i = C_i \div S_i$.

Summarizing the above, the above-described algorithm begins by treating each link as its own separate "mini-cluster" containing a single link and assigning server counts to each link/mini-cluster. If the assignment does not use more servers than are actually available, then all of the goals have been satisfied by that assignment; therefore, the algorithm terminates after computing the per-server bandwidth limit by dividing each link/mini-cluster capacity by the corresponding machine count. Otherwise, the algorithm merges the two smallest links/mini-clusters into a single new mini-cluster (whose capacity is the sum of the two to-be-merged capacities) and starts over, repeating as many times as needed to arrive at a valid solution. Note that the primary effect of merging is that multiple links can use the same set of servers to achieve the minimum server count ($S_{MIN}$). Each round of assignments examines the links/mini-clusters in order of ascending link capacity. In all cases in the above-described embodiment, preferably the algorithm assigns the minimum number of servers ($S_{MIN}$) for redundancy. Assigning more servers than the ceiling of the link capacity divided by server capacity would leave some server capacity unused, so in the described embodiment the algorithm does not exceed that limit ($M_i$), except to satisfy $S_{MIN}$. Subject to these limits, when total link capacity exceeds total server capacity, the algorithm assigns servers proportionately ($P_i$) with the link capacities. Using a "ceiling" for that computation generally results in assigning more servers than are available even with an otherwise viable solution, so preferably the computation uses a "floor" operation instead. The final piece of the assignment algorithm ($R_i$) may increase (but not decrease) the server assignment above the proportional $P_i$ value, in particular, by considering the remaining to-be-assigned link capacity and server count to allow leftover fractional servers from the downward rounding (floor) in the previous steps from to be assigned later. In this embodiment, note that both the proportional and rounding calculations are required. In this regard, without the rounding calculation, the solution could leave some servers unused while simultaneously leaving some links underutilized; likewise, without the proportion calculation, the rounding calculation will assign too few servers when previously examined mini-clusters that ultimately should be merged have already used up "too many" machines. Note also that the algorithm uniformly applies the proportional $P_i$ and rounding $R_i$ calculations even when total server capacity well exceeds total link capacity; in this case, $S_{MIN}$ and $M_i$ will simply dominate $P_i$ and $R_i$.

As a result of execution of the above-described algorithm, a set of information about the server and network capacity provisioned for the customer is generated. This information includes, e.g., an identifier for the mini-cluster provisioned, a list of server or virtual Internet Protocol (IP) addresses statically or dynamically configured for each mini-cluster, the geolocation of the mini-cluster, the link associated with the mini-cluster, a list of Autonomous System Numbers (ASNs) or IP subnets supported by the link, a maximum bandwidth allowed for the customer on the link, and any other information that may be relevant to the customer (e.g., information about a parent-tier server deployment), information known to the cloud provider about the content served by the mini-cluster, and any other information that may be requested by the customer entity to facilitate its load balancing decisions.

FIG. 5 depicts a representative example of a set of capacity information that the cloud provider shares with a customer entity. Preferably, the cloud provider shares the capacity information about the server and network bandwidth provisioned for the customer via one or more communication mechanisms including, without limitation, REST-based APIs, DNS-based APIs, and publish-subscribe models. The information may be structured in any format (e.g., text, XML, AJAX, HTTPS-based request and response) mutually agreed upon by the cloud provider and the customer. The information is shared periodically, or upon a given occurrence, e.g., when a change is made to the server and network bandwidth available to the customer. The data is ingested into the customer's load balancer (or other traffic management system), where it is instantiated. Preferably, the data set generated by the cloud provider is instantiated in an automated manner using tooling associated with the load balancer or other traffic manager.

The approach described may have several variants. In a first variant embodiment, if the customer requirements for server and network bandwidth are applied to certain time windows, the capacity deployed by the cloud provider can be disassociated from the customer workload and repurposed for other workloads. In another variant, if the available network bandwidth for a link changes due to maintenance or other factors, causing link overloads, the above-described algorithm is re-executed, thereby enabling the cloud provider to recalculate the number of servers and their maximum allowed egress capacity for each server to match the now-available network bandwidth on the link in question. Once calculated, the cloud provider suspends or adds one or more servers to the mini-cluster associated with the link and adjust the total compute server capacity to the updated link bandwidth. With this approach, the cloud provider controls (indirectly) the customer traffic, all without impacting traffic served over non-overloaded links associated with the cloud provider's data center.

The particular hardware and software details of a mini-cluster may vary. Typically, a mini-cluster will have at least several (e.g., 2-3) servers to accommodate any unexpected hardware failure. In a variant embodiment, it is assumed that a mini-cluster has its assigned minimum server count, but that there is still spare capacity from the servers (i.e., spare capacity not initially assigned); in such case if a machine in the mini-cluster fails, a spare machine is already present and can assume the service address of the failed machine. More generally, the approach herein may leverage additional server or VM resources in the physical server cluster as needed when mini-clusters are provisioned or re-configured.

Provisioning sufficient servers for a customer serving traffic on a link is important for the successful operation of customer services. If one or more servers assigned to a link fail, the cloud provider should have provisions to replace the impacted server capacity. As such, there are several techniques a cloud provider may adopt to build redundancy when provisioning capacity for customers. One approach, which is mentioned above, is to ensure that each mini-cluster has at least N servers assigned to it, where in one embodiment N may be 3 initially. This approach may be implemented in datacenters with sufficient servers available or a collection of small network links that allow for the final server placement to meet the minimum server requirements. Alternatively, a cloud provider may initially allocate server counts based on link capacity even though this assignment may result in fewer than N servers per link. In this case, the cloud provider could also deploy a common pool of "spare" servers within the same datacenter which would be used to replace any servers experiencing issues regardless of which link to which they are assigned. If a machine fails in a particular cluster, a spare machine the assumes the service address of the failed machine. More specifically, in this approach, the cloud provider spins up designated spares in advance but does not send traffic to them; it then monitors the network for updates to the "links" mapping for the spare server/IP to be moved from the "spare" pool and added to the impacted link's cluster to adjust its mapping.

Preferably, a mini-cluster is implemented virtually and thus provisioning the mini-cluster does not necessarily require any physical changes to how actual machines (or sets of machines) comprising a physical cluster (from which the mini-cluster is configured) are setup.

The above-described technique is robust against customer provisioning errors or other external factors, such as load balancer software bugs that could cause mistakes while that system is performing mapping decisions. Generalizing, the solution of this disclosure protects the cloud provider's infrastructure from several issues that could arise with respect to the customer's load balancer or other traffic management system. A first is when the customer load-balancer incorrectly sends more traffic than defined by the cloud provider on a particular link. To protect the cloud provider from such mistakes, the cloud provider also preferably implements throttling limits on the servers within the mini-cluster associated with the link. This limit prevents all excess traffic from being served over the link, thus preventing link overloads. A second type of error may occur when the load balancer incorrectly uses a server for an unassociated link, e.g., using a server associated with link A for serving traffic over link B. To protect against this type of mistake, the cloud provider preferably implements a traffic filter on all servers within the mini-cluster to only allow traffic for the associated link to be served. All traffic belonging to non-associated links is dropped.

Given that a server provisioned by the cloud provider is used to serve only a limited number of links, as opposed to all links, the server may be underutilized, especially when the link with which it is associated within the mini-cluster is smaller than the server's maximum capacity. To prevent server underutilization, the remaining capacity of the server may be used for another customer if the remaining compute resources are suitable to meet that other customer's requirements. Later, if the cloud provider needs to reduce a given customer traffic on a link, the resources utilized for that customer are suspended. A multi-customer deployment on a server is possible through virtualization, where each customer has its own dedicated VMs, container, or pod using a portion of the physical server's resources.

The following section describes a general approach for determining link limits for a particular customer. By way of additional background, the overlay network typically includes a mapping functionality that directs resource requests (e.g., overlay network-specific hostnames) to regions (typically groups of co-located machines) and edge servers within those regions. As used herein, an "edge server" refers to a CDN (overlay network) edge machine or server process used thereon. In the above-described context, a "region" typically is a set of edge servers or machines that are co-located with one another. More formally, a "region" or "cluster" typically is a collection of machines in a single location within a given region that share equivalent front-end network connectivity and also share a local back-end network. A set of such regions and associated network infrastructure (e.g., within a metropolitan area or "metro") that shares connectivity to the Internet is sometimes referred to herein as an Equivalence-Class-Of-Region ("ECOR"). There may be multiple ECORs in any given city (although there may be cases where an ECOR spans physical nearby buildings, such as with DWDM interconnects). The overlay network mapping functionality may also include a resource management component (RM) that assigns bandwidth targets for regions and links associated with those regions. Generally, this component attempts to manage the load on each link by adjusting the (controllable) traffic capacity (for various networking elements) given to one or more load balancing functions (which may be global- or region-based). To this end, the management component considers link demand data (e.g., an amount of demand assigned to a link).

For the CDN traffic use case (which involves "controllable" traffic), RM traditionally provides region-based mapping routines load and allowed bandwidth on a given region-link pair. As has been described above, customer entities typically have their own software system—such as a customer entity load balancer—that place uncontrollable traffic on the overlay, and they do so without using the overlay network mapping routines for link load balancing. According to an aspect of this disclosure, the RM component is extended to provide a specialty service that determine the link limits for a particular customer entity's mini-cluster. This is done by looking at all uncontrollable and controllable load sources of varying priorities, as well as other network health metrics (such as ongoing maintenance, link imbalance issues, and active overload conditions), to dynamically calculate a safe capacity value for the link that maximizes the customer entity's expected or requested capacity without jeopardizing overloading the link. In one embodiment, this information is computed for all link types, including virtual/logical and physical links so that any real source of the network bottleneck can be identified, and further that appropriate safety measures can be applied to it. The output of the RM specialty service is consumed by a subscribing component (such as the customer entity load balancer) to keep the overlay network free from congestion and performance degradation issues. The load from specialty service regions is treated as uncontrollable load by RM.

The techniques herein provide significant advantages. The approach seamlessly offloads traffic on overloaded links, thereby preventing link overloads and service degradation in a cloud provider's infrastructure-all without relying on customer actions. The techniques enable the cloud provider to retain traffic on non-overloaded links, and to minimize the need to suspend servers deployed for customers. Further, the solution enables the cloud provider to control customer traffic per changing network bandwidth availability, and to maximize the resource utilization of deployed servers. A further advantage is that the solution maintains network safety even if the customer's load balancers make incorrect mapping decisions. A related benefit is that the traffic control is only carried out and thus only impacts the traffic on the overloaded link, as the solution avoids the techniques of the prior art wherein all server traffic is throttled to mitigate existing link overloads. Conversely, traffic on non-overloaded links is not impacted. Also, the solution automatically adjusts customer traffic when available network bandwidth changes, including link failures, maintenance, and capacity reductions or increases.

As has been described above, and because customers continue to be the sole authority in making load-balancing decisions, the solution is based on cloud provider's ability—seamlessly and reliably—to provide the customer with information about the changes to the server fleet deployed for the customer and the available network bandwidth. The customer entity load balancing and other related system are then configured, preferably in an automated manner, to use the cloud provider's supplied server deployment and network connectivity information to make load-balancing decisions.

Enabling Technologies

Distributed computer systems are well-known in the prior art. One such distributed computer system is a "content delivery network" (CDN) or "overlay network" that is operated and managed by a service provider. The service provider typically provides the content delivery service on behalf of third parties (customers) who use the service provider's shared infrastructure. A distributed system of this type typically refers to a collection of autonomous computers linked by a network or networks, together with the software, systems, protocols and techniques designed to facilitate various services, such as content delivery, web application acceleration, or other support of outsourced origin site infrastructure. A CDN service provider typically provides service delivery through digital properties (such as a website), which are provisioned in a customer portal and then deployed to the network.

Cloud computing is an information technology delivery model by which shared resources, software and information are provided on-demand over a network (e.g., the publicly-routed Internet) to computers and other devices. This type of delivery model has significant advantages in that it reduces information technology costs and complexities, while at the same time improving workload optimization and service delivery. In a typical use case, an application is hosted from network-based resources and is accessible through a conventional browser or mobile application. Cloud compute resources typically are deployed and supported in data centers that run one or more network applications, typically using a virtualized architecture wherein applications run inside virtual servers, or virtual machines (VMs), which are mapped onto physical servers in the data center. The virtual machines typically run on top of a hypervisor, which allocates physical resources to the virtual machines.

More generally, the techniques described above are provided using a set of one or more computing-related entities (systems, machines, processes, programs, libraries, functions, or the like) that together facilitate or provide the described functionality described above. In a typical implementation, a representative machine on which the software executes comprises commodity hardware, an operating system, an application runtime environment, and a set of applications or processes and associated data, which provide the functionality of a given system or subsystem. As described, the functionality may be implemented in a standalone machine, or across a distributed set of machines. The functionality may be provided as a service, e.g., as a SaaS solution.

Because the CDN infrastructure (or "edge platform") is shared by multiple third parties, it is sometimes referred to herein as a multi-tenant shared infrastructure. The CDN processes may be located at nodes that are publicly-routable on the Internet, within or adjacent nodes that are located in mobile networks, in or adjacent enterprise-based private networks, or in any combination thereof.

As used herein, an "edge server" refers to a CDN (overlay network) edge machine or server process used thereon. In the above-described context, a "region" typically is a set of edge servers or machines that are co-located with one another. More formally, a "region" or "cluster" typically is a collection of machines in a single location within a given region that share equivalent front-end network connectivity and also share a local back-end network. A set of such regions and associated network infrastructure (e.g., within a metropolitan area or "metro") that shares connectivity to the Internet is sometimes referred to herein as an Equivalence-Class-Of-Region ("ECOR"). There may be multiple ECORs in any given city (although there may be cases where an ECOR spans physical nearby buildings, such as with DWDM interconnects).

The edge platform as described is a deployed network designed to manage large numbers of distributed servers in a distributed fashion. To this end, and in one non-limiting embodiment, the platform leverages an underlying Linux-based operating system (OS) (e.g., a Linux kernel version that is Ubuntu-based). A Linux kernel version of this type (sometimes referred to herein as Linux Server Install (LSI)) may have one or more supporting services such as log aggregation, data aggregation and query reporting, secret management, and the like. Using the LSI and its related services, the system provides for: deploying and managing servers at scale; role-based and standards-compliant remote access control and audit functionality; a secret management system for distributing key materials; a Network Operations Control Center (NOCC) for tooling and expertise managing systems; a platform that incorporates ways to distribute critical control information with multiple safety features built-in, and techniques for keeping server BIOS and firmware up-to-date. The LSI is readily patched and features can be added thereto as needed.

As noted, cloud computing is a model of service delivery for enabling on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. Available service models that may be leveraged in whole or in part include: Software as a Service (Saas) (the provider's applications running on cloud infrastructure); Platform as a service (PaaS) (the customer deploys applications that may be created using provider tools onto the cloud infrastructure); Infrastructure as a Service (IaaS) (customer provisions its own processing, storage, networks and other computing resources and can deploy and run operating systems and applications). Typically, the cloud computing environment has a set of high level functional components that include a front end identity manager, a business support services (BSS) function component, an operational support services (OSS) function component, and the compute cloud components themselves.

A representative cloud computing infrastructure is implemented in a data center operated by a virtual machine (VM) hosting provider. A representative provider is Linode®, now owned by Akamai Technologies, Inc., of Cambridge, Massachusetts. In this infrastructure, a "Host" refers to a bare-metal machine running software. A "Compute Host" is a machine that manages virtual machines VMs and typically runs associated administrative software for a cloud compute infrastructure. A "Guest VM" is a virtual machine running on a Compute Host, and it may be a customer VM or an infrastructure VM. A "Datacenter" (CD) typically is a customer-facing abstraction for cloud compute infrastructure, typically a cluster of Guest VMs.

A virtual machine has associated therewith persistent storage, the amount of which typically varies based on size and type, and memory (RAM). The persistent storage typically is built on enterprise-grade SSDs (solid state disks). The VM's persistent storage space can be allocated to individual disks. Disks can be used to store any data, including the operating system, applications, and files.

A cloud compute networking infrastructure is typically implemented in a datacenter. A representative architecture is based on a non-blocking, multistage switching network (e.g., CLOS) with Border Gateway Protocol (BGP) as the routing protocol between switches. Hosts in the datacenter are physical boxes that contain the VMs. This site may be managed by a control plane VMs are provisioned, executed, and re-positioned as needed. In a representative embodiment, the control plane is managed "as-a-service" from a secure web application available, e.g., from a service provider domain or subdomain. After becoming a customer, secure permissioned access to the control plane is provided to enable the customer to provision and manage its workloads in the compute infrastructure.

The above-described link safety mechanism may interoperate with existing cloud provider or overlay network (as the case may be) control mechanisms, such as the resource manager (RM) mapping component. Traditionally, and for the CDN traffic use case, the RM component provides other overlay network mapping components with load and allowed bandwidth on a link for the CDN traffic to use.

Each of the functions described herein may be implemented in a hardware processor, as a set of one or more computer program instructions that are executed by the processor(s) and operative to provide the described function.

The cloud compute infrastructure may be augmented in whole or in part by one or more web servers, application servers, database services, and associated databases, data structures, and the like.

More generally, the techniques described herein are provided using a set of one or more computing-related entities (systems, machines, processes, programs, libraries, functions, or the like) that together facilitate or provide the functionality described above. In a typical implementation, a representative machine on which the software executes comprises commodity hardware, an operating system, an application runtime environment, and a set of applications or processes and associated data, networking technologies, etc., that together provide the functionality of a given system or subsystem. As described, the functionality may be implemented in a standalone machine, or across a distributed set of machines.

Each above-described process, module or sub-module preferably is implemented in computer software as a set of program instructions executable in one or more processors, as a special-purpose machine.

Representative machines on which the subject matter herein is provided may be computing machines running hardware processors, virtualization technologies (including QEMU), a Linux operating system, and one or more applications to carry out the described functionality. One or more of the processes described above are implemented as computer programs, namely, as a set of computer instructions, for performing the functionality described.

While the above describes a particular order of operations performed by certain embodiments of the disclosed subject matter, it should be understood that such order is exemplary, as alternative embodiments may perform the operations in a different order, combine certain operations, overlap certain operations, or the like. References in the specification to a given embodiment indicate that the embodiment described may include a particular feature, structure, or characteristic, but every embodiment may not necessarily include the particular feature, structure, or characteristic.

While the disclosed subject matter has been described in the context of a method or process, the subject matter also relates to apparatus for performing the operations herein. This apparatus may be a particular machine that is specially constructed for the required purposes, or it may comprise a computer otherwise selectively activated or reconfigured by a computer program stored in the computer. Such a computer program may be stored in a computer readable storage medium, such as, but is not limited to, any type of disk including an optical disk, a CD-ROM, and a magnetic-optical disk, a read-only memory (ROM), a random access memory (RAM), a magnetic or optical card, or any type of media suitable for storing electronic instructions, and each coupled to a computer system bus.

While given components of the system have been described separately, one of ordinary skill will appreciate that some of the functions may be combined or shared in given instructions, program sequences, code portions, and the like. Any application or functionality described herein may be implemented as native code, by providing hooks into another application, by facilitating use of the mechanism as a plug-in, by linking to the mechanism, and the like.

The platform functionality may be co-located or various parts/components may be separately and run as distinct functions, perhaps in one or more locations (over a distributed network).

Generalizing, the techniques may be implemented in a computing platform, wherein one or more functions of the computing platform are implemented conveniently in a cloud-based architecture. As is well-known, cloud computing is a model of service delivery for enabling on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. Available service models that may be leveraged in whole or in part include: Software as a Service (Saas) (the provider's applications running on cloud infrastructure); Platform as a service (PaaS) (the customer deploys applications that may be created using provider tools onto the cloud infrastructure); Infrastructure as a Service (IaaS) (customer provisions its own processing, storage, networks and other computing resources and can deploy and run operating systems and applications).

The platform may comprise co-located hardware and software resources, or resources that are physically, logically, virtually and/or geographically distinct. Communication networks used to communicate to and from the platform services may be packet-based, non-packet based, and secure or non-secure, or some combination thereof. Typically, the cloud computing environment has a set of high level functional components that include a front end identity manager, a business support services (BSS) function component, an operational support services (OSS) function component, and the compute cloud components themselves.

According to this disclosure, the link safety mechanism may be part of the cloud provider or overlay network provider infrastructure, or it may operate as a standalone service that executes in association with third party cloud compute services.

The term "mini" as used with respect to the phrase "mini-cluster" is not intended to require a certain minimum specified number of servers; as described above, the number of servers and their capacity as configured for a given mini-cluster is dependent on the factors identified above in the link-to-mini-cluster algorithm.

What is claimed is as follows:

1. A method of protecting a set of links associated with a cloud provider network infrastructure, where the cloud provider network infrastructure supports a class of traffic placed on the cloud provider's network infrastructure by a software system associated with a customer entity and not controlled by the cloud provider network infrastructure, comprising:

configuring, from a physical server cluster in the cloud provider's network infrastructure, a mini-cluster, wherein the mini-cluster comprises a set of one or more servers, the mini-cluster dedicated to servicing only one link of the set of links;

determining a maximum bandwidth allowed for the customer entity with respect to the link;

capping an egress capacity of each of the servers in the mini-cluster to match the maximum link capacity determined for the customer entity;

outputting information from the cloud provider network infrastructure to the software system associated with the customer entity, the information identifying the link, the mini-cluster, a list of server or virtual Internet Protocol (IP) addresses configured for the mini-cluster, and the maximum bandwidth allowed for the customer entity on the link; and following configuration of the software system associated with the customer entity at least in part based on the information, receiving and servicing the class of traffic via the link.

2. The method as described in claim 1, wherein the mini-cluster is implemented virtually.

3. The method as described in claim 1, wherein a cloud provider associated with the cloud provider network infrastructure operates an overlay network that has been extended to provide a cloud computing service.

4. The method as described in claim 1, wherein the link is a physical or virtual network connection serving a group of destination Classless inter Domain Routing (CIDR) blocks, Autonomous System Numbers (ASNs), or other network resources.

5. The method as described in claim 1, wherein the mini-cluster is a group of virtual servers deployed in a datacenter.

6. The method as described in claim 1, wherein the software system assoicated with the customer entity is a load balancer.

7. The method as described in claim 1, further including determining a number of servers to include in the mini-cluster utilizing a link to mini-cluster allocation algorithm.

8. The method as described in claim 1, wherein a mini-cluster is configured for at least first and second customer entities that are distinct from one another.

9. The method as described in claim 1, wherein the information further includes one of: a geolocation of the mini-cluster, a list of Autonomous System Numbers (ASNs) or IP subnets supported by the link, information about a parent-tier server deployment associated to the customer entity, information about content served by the mini-cluster, and any information requested by the customer entity for load-balancing decisions.

10. The method as described in claim 1, wherein, after the mini-cluster is configured, the link of the set of links does not service traffic from another customer entity.

11. The method as described in claim 1, wherein the mini-cluster is configured with additional spare server capacity.

12. The method as described in claim 1, wherein the information is output to the software system associated with the customer entity periodically or upon a given occurrence.

13. The method as described in claim 1, further including automatically instantiating control signaling in the software system associated with the customer entity based on the information.

14. The method as described in claim 1, wherein the maximum bandwidth allowed for the customer entity is computed by evaluating uncontrollable and controllable sources of traffic of varying priorities, together with one or more network health metrics.

15. The method as described in claim 1, wherein another link in the set of links is unaffected by the traffic on the link.

* * * * *